(12) United States Patent
Takahashi et al.

(10) Patent No.: US 11,946,603 B2
(45) Date of Patent: Apr. 2, 2024

(54) FACILITY STATE ANALYZING DEVICE, FACILITY STATE ANALYZING METHOD, AND RECORDING MEDIUM STORING FACILITY STATE ANALYZING PROGRAM THEREON

(71) Applicant: NEC Corporation, Tokyo (JP)

(72) Inventors: Masatake Takahashi, Tokyo (JP); Shin Tominaga, Tokyo (JP)

(73) Assignee: NEC CORPORATION, Tokyo (JP)

( * ) Notice: Subject to any disclaimer, the term of this patent is extended or adjusted under 35 U.S.C. 154(b) by 906 days.

(21) Appl. No.: 16/964,379

(22) PCT Filed: Feb. 14, 2019

(86) PCT No.: PCT/JP2019/005360
§ 371 (c)(1),
(2) Date: Jul. 23, 2020

(87) PCT Pub. No.: WO2019/160043
PCT Pub. Date: Aug. 22, 2019

(65) Prior Publication Data
US 2020/0347994 A1    Nov. 5, 2020

(30) Foreign Application Priority Data
Feb. 16, 2018  (JP) ................. 2018-026173

(51) Int. Cl.
*G06N 5/04*        (2023.01)
*F17D 5/00*        (2006.01)
(Continued)

(52) U.S. Cl.
CPC ............... *F17D 5/00* (2013.01); *G06N 5/04* (2013.01); *G06N 20/00* (2019.01);
(Continued)

(58) Field of Classification Search
CPC ....... F17D 5/00; F17D 5/02; G06Q 10/06316; G06Q 10/06375; G06Q 10/20;
(Continued)

(56) References Cited

U.S. PATENT DOCUMENTS

| | | | |
|---|---|---|---|
| 9,964,468 B1* | 5/2018 | Wu | G01M 5/00 |
| 2003/0171879 A1* | 9/2003 | Pittalwala | F17D 5/00 |
| | | | 702/34 |
| 2010/0313958 A1* | 12/2010 | Patel | E03B 7/071 |
| | | | 137/552 |

FOREIGN PATENT DOCUMENTS

| | | |
|---|---|---|
| EP | 2940447 A1 | 11/2015 |
| JP | H11-014782 A | 1/1999 |

(Continued)

OTHER PUBLICATIONS

International Search Report for PCT Application No. PCT/JP2019/005360, dated May 7, 2019.
(Continued)

*Primary Examiner* — Manuel L Barbee (57) ABSTRACT

A facility state analyzing device includes: a measurement unit that measures a load on a facility and generates, based on a measurement condition, load information representing the load being measured; an extraction unit that extracts, from the load information generated by the measurement unit, dynamic load information representing a dynamic component of the load whose dynamic fluctuation degree with a lapse of time is equal to or more than a reference; a measurement condition determination unit that determines, based on temporal transition of the dynamic load information, the measurement condition indicating a time zone during which the load information is generated; and an analysis unit that analyzes the load applied on the facility, by using the load information generated based on the measurement condition, to efficiently increase accuracy in estimating (Continued)

the state of the facility on the basis of a situation of the load applied to the facility.

10 Claims, 5 Drawing Sheets

(51) Int. Cl.
  *G06N 20/00* (2019.01)
  *G06Q 10/0631* (2023.01)
  *G06Q 10/0637* (2023.01)
  *G06Q 10/20* (2023.01)
  *G06Q 50/26* (2012.01)
(52) U.S. Cl.
  CPC . *G06Q 10/06316* (2013.01); *G06Q 10/06375* (2013.01); *G06Q 10/20* (2013.01); *G06Q 50/26* (2013.01)
(58) Field of Classification Search
  CPC .. G06Q 50/26; G01M 5/0025; G01M 5/0041; G01M 5/0033; G01M 99/00
  See application file for complete search history.

(56) References Cited

FOREIGN PATENT DOCUMENTS

| | | | |
|---|---|---|---|
| JP | 2002-310840 | A | 10/2002 |
| JP | 2007-205860 | A | 8/2007 |
| JP | 4371119 | B2 | 11/2009 |
| JP | 2012-112787 | A | 6/2012 |
| JP | 2014-016691 | A | 1/2014 |
| WO | 2013/173860 | A2 | 11/2013 |
| WO | 2016/059462 | A1 | 4/2016 |

OTHER PUBLICATIONS

English translation of Written opinion for PCT Application No. PCT/JP2019/005360, dated May 7, 2019.
Extended European Search Report for EP Application No. EP19755075.9 dated Mar. 15, 2021.

* cited by examiner

18 PRESENTATION UNIT (MONITOR)

MEASUREMENT CONDITION OF LOAD ON WATER PIPELINE

| MEASUREMENT TIME ZONE |
|---|
| MONDAY–FRIDAY: 7:00–8:00 |
| MONDAY–FRIDAY: 18:00–19:00 |
| MONDAY–SUNDAY: 21:00–23:00 |
| SATURDAY–SUNDAY: 8:00–9:00 |
| SATURDAY–SUNDAY: 12:00–1:00 |
| SATURDAY–SUNDAY: 19:00–20:00 |
|  |

| MEASUREMENT PLACE |
|---|
| SPOT A($X_a$, $Y_a$, $Z_a$) |
| SPOT B($X_b$, $Y_b$, $Z_b$) |
| SPOT C($X_c$, $Y_c$, $Z_c$) |
| SPOT D($X_d$, $Y_d$, $Z_d$) |
| SPOT E($X_e$, $Y_e$, $Z_e$) |
| SPOT F($X_f$, $Y_f$, $Z_f$) |
| SPOT G($X_g$, $Y_g$, $Z_g$) |

FACILITY STATE ANALYZING DEVICE, FACILITY STATE ANALYZING METHOD, AND RECORDING MEDIUM STORING FACILITY STATE ANALYZING PROGRAM THEREON

This application is a National Stage Entry of PCT/JP2019/005360 filed on Feb. 14, 2019, which claims priority from Japanese Patent Application JP2018-026173 filed on Feb. 16, 2018, the contents of all of which are incorporated herein by reference, in their entirety.

TECHNICAL FIELD

The present invention relates to a technique of analyzing, by analyzing a load applied on a facility, a state of the facility.

BACKGROUND ART

With advance of information and communication technology (ICT), an information volume processed by or accumulated in electronic equipment has been on a steady increasing trend, and Internet of things (IoT) is being achieved. In a society where IoT is constructed, correct data of an event are acquired from a large number of sensors, the acquired data are correctly analyzed, determined, and processed, and the resulting data are then recognized by a person as useful information, which occupies an important place in order to form a secure and safe society.

In a modern society, facilities such as water and sewerage networks, high-pressure chemical pipelines such as gas and petroleum, high-speed railroads, long-span bridges, super-high buildings, large-scale aircrafts, and automobiles are constructed, resulting in formation of a rich social infrastructure. However, when these facilities are broken due to a natural disaster such as an unexpected earthquake disaster, age deterioration, or the like, causing a serious accident to occur, an influence on society is huge and economic loss is large. In a member used for these facilities, deterioration such as corrosion and friction progresses with a usage time, leading eventually to malfunction such as breakage. Therefore, in order to ensure security and safety for a facility, a great amount of effort is being applied to technical development beyond an academic territory such as science, engineering, and sociology. In particular, a maintenance management technique for a social infrastructure using a non-destructive inspection technique or the like being a low-cost and easy-to-operate inspection technique is becoming more and more important in a point that a serious accident due to deterioration or breakage of a facility is prevented.

As a technique relating to such a technique, PTL 1 discloses a device that evaluates a fatigue life of equipment. The device determines, based on information of a member shape and a constituent material of equipment, an elastic stress of the equipment. The device determines, based on the determined elastic stress, a stress and a strain during loading in the constituent material. The device determines a stress and a strain during load elimination by using a stress and a strain during loading as a base point. The device determines, based on the stress and strain during loading and the stress and strain during load elimination, a plastic strain. The device determines, based on the determined plastic strain, whether a fatigue pattern of the member is high-cycle fatigue due to only elastic deformation or low-cycle fatigue accompanied with plastic deformation. The device then determines, based on the determined fatigue pattern, a life of the equipment.

PTL 2 discloses an endurance evaluation method of an existing sign pole, in which without performing work that damages the existing sign pole and without a worker approaching to the existing sign pole and performing cumbersome work, safety of the existing sign pole is confirmed. The method includes a real amplitude amount measurement process of measuring, in a contactless manner, a real amplitude amount of a pillar member of an existing sign pole, and a stress calculation process of calculating, from the real amplitude amount, a bending stress of a base of the existing sign pole. The method determines a dynamic amplitude amount of an upper end of a pillar member and a dynamic bending stress of a base of the pillar member, applies a static tensile force to a tip of an arm member in such a way that a static deflection amount and a static bending stress of the pillar member are matched with the dynamic amplitude amount and the dynamic bending stress, and determines a tensile angle of the static tensile force with respect to the arm member. The method calculates, based on the tensile angle and the real amplitude amount, a horizontal force and a vertical force that act on the tip of the arm member from a general deflection equation. The method then calculates, from a bending moment that acts on the base of the pillar member being calculated based on the horizontal force and the vertical force by using the general moment calculation equation, a bending stress that acts on the base of the pillar member.

PTL 3 discloses a system that quantifies a state and a value of an existing asset and assists, from a facility update demand and fiscal balance information, appropriate maintenance management and update plan making of a water and sewerage operation from a medium- and long-term perspective. The system acquires, into a calculator system, various types of facility information, inspection maintenance data, monitoring data, and plant data input from a water and sewage facility at a monitoring cycle determined for each piece of data or optionally and stores the acquired information and data in a database. The system evaluates, from the stored inspection maintenance and monitoring data for the facility, a qualitative soundness degree, calculates a statistical durable life based on a deterioration diagnosis prediction, equalizes, according to a risk level set for each facility, a facility update demand cost conforming to a budget limit, and assists demand plan making.

CITATION LIST

Patent Literature

[PTL 1] Japanese Unexamined Patent Application Publication No. 2012-112787
[PTL 2] Japanese Unexamined Patent Application Publication No. 2007-205860
[PTL 3] Japanese Unexamined Patent Application Publication No. 2014-016691

SUMMARY OF INVENTION

Technical Problem

A facility and a structural object such as a water and sewage network, and a pipeline in an important social infrastructure have a long durable life of several decades, and generally, a maintenance management operation such as facility introduction, repair, and update in a life cycle is performed based on an asset management method. The asset management method estimates, as a risk, a deterioration degree of an infrastructure facility in the future and an influence degree during accident occurrence. The method then derives an optimum balance between the estimated result and an expense being able to be input into maintenance management of a facility, and thereby performs, while equalizing the maintenance management expense, preventive maintenance in such a way as to keep an accident probability and an accident risk at a certain level or less.

A method of updating a facility, based on a deterioration degree of the facility, includes a method of updating, by using an installation year of the facility as a reference, a facility having been used for a certain period in order from the oldest, and a state-monitoring preventive maintenance method of performing update according to a deterioration degree based on data collected by a sensor and information representing a facility specification and the like. In general, the state-monitoring preventive maintenance method does not update, when a soundness degree is high even in an old facility, the facility. Therefore, the state-monitoring preventive maintenance method is advantageous, even when an introduction cost of the method is considered, in a maintenance management expense, and therefore an application of the method is expanding.

When an accident probability in the future with respect to a facility is estimated, it is important to appropriately evaluate not only a deterioration degree of a facility but also a load applied on the facility. The load fluctuates according to a year, a season, a time, a place, and the like, and therefore it is known that, in an evaluation, for example, based on only information relating to a load at a time of designing a facility, it is difficult to acquire satisfactory estimation accuracy. In order to cope with such a problem, it is conceivable that, in an appropriate place and an appropriate time zone, a physical situation for a facility is directly observed by using a sensor and thereby estimation accuracy is increased.

However, commonly, an observation condition (observation specification) itself based on a sensor is also similarly based on information at a time of designing, and therefore it is difficult to appropriately maintain and manage a facility since, for example, the facility is deteriorated and it is difficult to appropriately estimate a current state of the facility in which a load state is different from a load state at a time of designing. In particular, in a water pipeline and the like frequently used by being buried in a ground, this problem is marked. In order to highly accurately estimate a current state of a facility, when an information volume collected from a sensor is increased, for example, by always collecting information from the sensor, a communication infrastructure is largely affected. PTLs 1 to 3 do not refer to such a problem. A main object of the present invention is to provide a facility state analyzing device and the like that solve the problem.

Solution to Problem

A facility state analyzing device according to one aspect of the present invention includes: a measurement means that measures a load on a facility and generates, based on a measurement condition, load information representing the load being measured; an extraction means that extracts, from the load information generated by the measurement means, dynamic load information representing a dynamic component of the load whose dynamic fluctuation degree with a lapse of time is equal to or more than a reference; a measurement condition determination means that determines, based on temporal transition of the dynamic load information, the measurement condition indicating a time zone during which the load information is generated; and an analysis means that analyzes the load applied on the facility, by using the load information generated based on the measurement condition.

From another viewpoint that achieves the object, a facility state analyzing method according to one aspect of the present invention includes, by an information processing device: measuring a load on a facility; generating, based on a measurement condition, load information representing the load being measured; extracting, from the load information being generated, dynamic load information representing a dynamic component of the load whose dynamic fluctuation degree with a lapse of time is equal to or more than a reference; determining, based on temporal transition of the dynamic load information, the measurement condition indicating a time zone during which the load information is generated; and analyzing the load applied on the facility, by using the load information generated based on the measurement condition.

From still another viewpoint that achieves the object, a facility state analyzing program according to one aspect of the present invention causes a computer to execute: measurement processing of measuring a load on a facility and generating, based on a measurement condition, load information representing the load being measured; extraction processing of extracting, from the load information generated by the measurement processing, dynamic load information representing a dynamic component of the load whose dynamic fluctuation degree with a lapse of time is equal to or more than a reference; measurement condition determination processing of determining, based on temporal transition of the dynamic load information, the measurement condition indicating a time zone during which the load information is generated; and analysis processing of analyzing the load applied on the facility, by using the load information generated based on the measurement condition.

The present invention can be further achieved by a computer-readable non-volatile recording medium storing the facility state analyzing program (computer program).

Advantageous Effects of Invention

The present invention enables efficiently increasing, based on a situation of a load applied on a facility, accuracy in estimating a state of the facility.

EXAMPLE EMBODIMENT

Hereinafter, example embodiments of the present invention are described in detail with reference to the drawings.

First Example Embodiment

Figure 1:
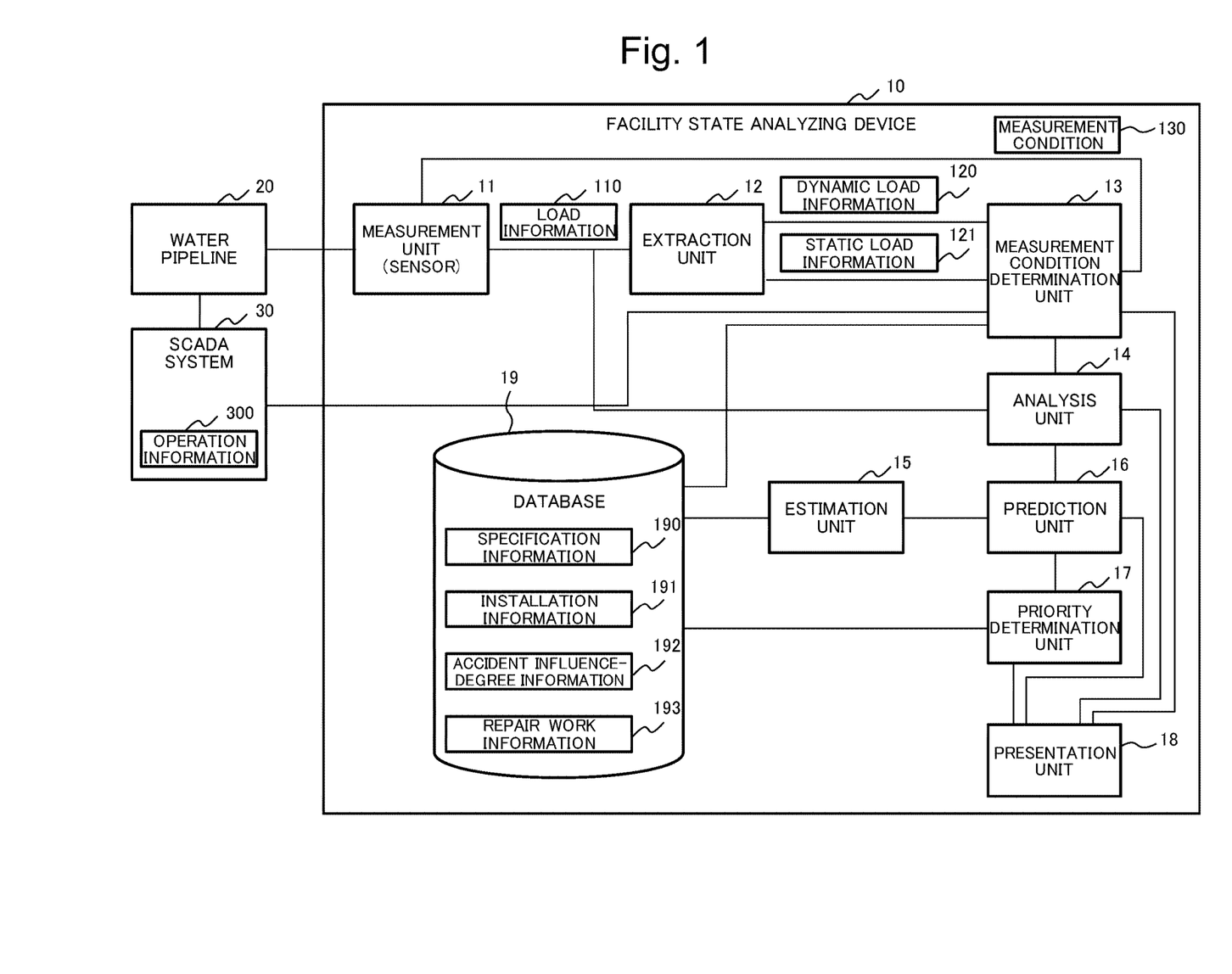
FIG. 1 is a block diagram illustrating a configuration of a facility state analyzing device 10 according to a first example embodiment of the present invention.

FIG. 1 is a block diagram illustrating a configuration of a facility state analyzing device 10 according to a first example embodiment of the present invention. The facility state analyzing device 10 is an information processing device including a function of collecting, in order to maintain and manage a water pipeline 20 being a social infrastructure, information representing a state of the water pipeline 20 and analyzing the collected information. In FIG. 1, for convenience of description, one water pipeline 20 is illustrated, but a plurality of water pipelines 20 may be an analysis target of a facility state for the facility state analyzing device 10.

The facility state analyzing device 10 includes a measurement unit 11, an extraction unit 12, a measurement condition determination unit 13, an analysis unit 14, an estimation unit 15, a prediction unit 16, a priority determination unit 17, a presentation unit 18, and a database 19.

The database 19 includes, for example, a non-volatile storage device such as a magnetic disk and stores specification information 190, installation information 191, accident influence-degree information 192, and repair work information 193 referred to when the facility state analyzing device 10 operates. Details of these pieces of information are described later. The facility state analyzing device 10 may not include the database 19. The database 19 may be constructed, for example, in a storage device or the like accessible by the facility state analyzing device 10 via a communication network.

The measurement unit 11 includes sensors that collect information (according to the present invention, hereinafter, referred to as load information) representing a state of a load on the water pipeline 20 and a function of transmitting/receiving information (data) among these sensors, based on wireless communication or wired communication. The sensors are, for example, water pressure sensors, flow rate sensors, vibration sensors, and the like. In FIG. 1, for convenience of description, the measurement unit 11 is illustrated inside the facility state analyzing device 10, but it is assumed that the sensors included in the measurement unit 11 are installed in various places, for example, on a surface or an inside of the water pipeline 20. The measurement unit 11 controls, based on a measurement condition 130 to be described later, output of load information 110 from the sensor. The measurement unit 11 inputs the load information 110 acquired (received) from the sensor to the extraction unit 12 and the analysis unit 14.

The extraction unit 12 separates the load information 110 input from the measurement unit 11 into dynamic load information 120 and static load information 121. However, the dynamic load information 120 is information representing a component, being included in a load on the water pipeline 20, a dynamic fluctuation degree of which with a lapse of time is equal to or more than a reference (a dynamic fluctuation is large). In contrast, the static load information 121 is information representing a component, being included in a load on the water pipeline 20, a dynamic fluctuation degree of which with a lapse of time is equal to or less than a reference (a dynamic fluctuation is small).

The extraction unit 12 separates, by executing predetermined signal processing for a signal representing the load information 110, the load information 110 into the dynamic load information 120 and the static load information 121. The extraction unit 12 can use, as the predetermined signal processing, processing (e.g. processing using Fourier transform) of analyzing a signal with respect to each frequency component, processing (e.g. processing applied with a band-pass filter or the like) of analyzing a temporal change of a signal, or the like. Alternatively, the extraction unit 12 may use, for example, a time-series data analysis method based on an autoregressive model, a moving average model, an autoregressive-moving average model, or the like.

Specific examples of a load on the water pipeline 20 indicated by the dynamic load information 120 and the static load information 121 include, for example, a dynamic pressure and a static pressure in fluid dynamics. A dynamic pressure is a pressure (a force pushed by a flow) generated by a flow of fluid (i.e. water flowing through the water pipeline 20) and increases as a flow velocity of fluid is faster. In contrast, a static pressure is a pressure generated even when fluid does not flow (i.e. in a state where fluid stops). A water pressure applied to the water pipeline 20 is a pressure combining both a dynamic pressure and a static pressure. However, when a measurement target based on the measurement unit 11 is a water pressure, it is assumed that sensors are installed in places where generated water pressures are different from each other (i.e. places where systems of water channels are different). A load represented by each of the dynamic load information 120 and the static load information 121 may be a physical amount other than a dynamic pressure and a static pressure.

The extraction unit 12 inputs, to the measurement condition determination unit 13, the dynamic load information 120 and the static load information 121 generated by executing the above-described processing.

The measurement condition determination unit 13 acquires the dynamic load information 120 and the static load information 121 from the extraction unit 12, and in addition, acquires operation information 300 from a supervisory control and data acquisition (SCADA) system 30, and acquires the specification information 190 stored in the database 19. The specification information 190 is information representing, for example, a specification of the water pipeline 20, such as a structure (a diameter or a shape, etc.) of the water pipeline 20 or a state where the water pipeline 20 is buried.

The SCADA system 30 is a system that monitors a state of the water pipeline 20 and remotely controls the state. The SCADA system 30 controls, based on the operation information 300, a state of the water pipeline 20. Operation information 300 is, for example, information representing operation management of the water pipeline 20 such as a water use amount via the water pipeline 20.

The measurement condition determination unit 13 determines, based on at least the dynamic load information 120, an optimum measurement time zone based on the measurement unit 11 in which it is achievable to highly accurately and efficiently acquire a state of the water pipeline 20. At that time, the measurement condition determination unit 13 may use at least any combination of the static load information 121, the operation information 300, and the specification information 190. In other words, the measurement condition determination unit 13 may use, for example, an indicator acquired by adding the static load information 121 to the dynamic load information 120. Alternatively, the measurement condition determination unit 13 may use, for example, a portion matched with the operation information 300 in the dynamic load information 120 (i.e. a portion unmatched with the operation information 300 is not used as incidental information). Alternatively, the measurement condition determination unit 13 may determine an optimum measurement time zone, for example, by considering a progress tendency of deterioration in the water pipeline 20 indicated by specification information 190.

The measurement condition determination unit 13 sets, for example, with respect to the water pipeline 20 installed in a residential street, as an initial value of a measurement time zone of the street, a continuous time zone of, for example, one week or longer, based on a fact that a lifestyle cycle of a person is generally one week. Alternatively, the measurement condition determination unit 13 sets, with respect to the water pipeline 20 installed in an industrial area, as an initial value of a measurement time zone of the area, a continuous time zone longer than an operation cycle of a factory. The measurement condition determination unit 13 sets, as described above, an initial value of a measurement time zone and thereby can efficiently avoid occurrence of an omission in determination of an optimum measurement time zone based on the measurement unit 11. The measurement condition determination unit 13 may set, based on a reference different from the above-described reference, an initial value of a measurement time zone.

The measurement condition determination unit 13 determines, for example, with respect to the water pipeline 20 installed in a residential street, a measurement time zone based on the measurement unit 11, based on a fluctuation situation of a dynamic pressure applied on the water pipeline 20 indicated by at least the dynamic load information 120 in a continuous time zone of one week or longer set as an initial value of the measurement time zone. At that time, the measurement condition determination unit 13 determines, as an optimum measurement time zone based on the measurement unit 11, a time zone in which as a load applied on the water pipeline 20 is larger, a damage degree of the water pipeline 20 increases.

The measurement condition determination unit 13 may determine an optimum measurement time zone based on the measurement unit 11, for example, in such a way as to include a time zone in which these values representing a load applied on the water pipeline 20 are equal to or more than a threshold. Alternatively, the measurement condition determination unit 13 may analyze a pattern in which a load applied on the water pipeline 20 fluctuates, by using a technique such as machine learning and determine, based on the analysis result, an optimum measurement time zone based on the measurement unit 11.

The measurement condition determination unit 13 inputs, to the measurement unit 11, the measurement condition 130 indicating the determined optimum measurement time zone based on the measurement unit 11. Thereby, the measurement unit 11 controls each sensor in such a way as to generate the load information 110 in the optimum measurement time zone indicated by the measurement condition 130.

The measurement condition determination unit 13 also determines, as follows, an optimum measurement place based on the measurement unit 11, in addition to an optimum measurement time zone based on the measurement unit 11 in which it is achievable to highly accurately and efficiently acquire a state of the water pipeline 20 as described above.

The measurement condition determination unit 13 calculates, based on a structure of the water pipeline 20 indicated by the specification information 190 acquired from the database 19, with respect to a water hammer generated in the water pipeline 20, a magnitude of the water hammer, a propagation path, a reach distance, and the like by simulation. However, it is assumed that the measurement condition determination unit 13 is provided with information (a calculation expression or the like) necessary for simulating the water hammer generated in the water pipeline 20. The measurement condition determination unit 13 identifies, based on the simulation result, a place on which a large load is applied in the water pipeline 20 and determines the identified place as an optimum measurement place based on the measurement unit 11.

The measurement condition determination unit 13 inputs, to the measurement unit 11, the measurement condition 130 indicating the determined optimum measurement place based on the measurement unit 11. Thereby, the measurement unit 11 controls, among a plurality of sensors, each sensor in such a way that the load information 110 is generated by a sensor located in a measurement place indicated by the measurement condition 130.

The measurement condition determination unit 13 inputs the measurement condition 130 determined as described above to the presentation unit 18. The presentation unit 18 is a device capable of presenting information to a user by using an input/output interface and is, for example, a monitor that presents, by means of an image, information to a user, a speaker that presents, by means of voice, information to a user, or the like. The presentation unit 18 presents, to a user, the measurement condition 130 input from the measurement condition determination unit 13.

Figure 2:
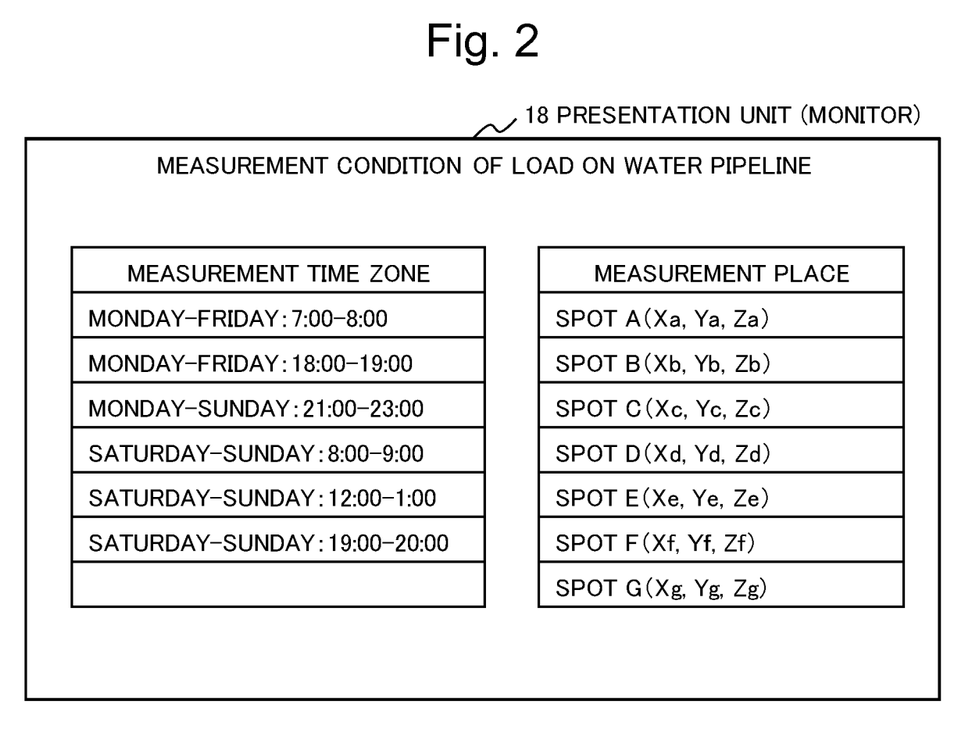
FIG. 2 is a diagram exemplarily illustrating a form in which a presentation unit 18 according to the first example embodiment of the present invention displays a measurement condition 130.

FIG. 2 is a diagram exemplarily illustrating a form in which the presentation unit 18 (a monitor) according to the present example embodiment displays the measurement condition 130. The presentation unit 18 displays, as exemplarily illustrated in FIG. 2, for example, an optimum measurement time zone indicated by the measurement condition 130, by means of a day of a week and a time, and displays an optimum measurement place indicated by the measurement condition 130, by means of a name of a spot and spatial coordinates (XYZ coordinates). A user can install a sensor in the optimum measurement place based on the measurement unit 11 indicated by the measurement condition 130 presented by the presentation unit 18.

The analysis unit 14 analyzes, from a sensor installed in the optimum measurement place indicated by the measurement condition 130, a load applied on the water pipeline 20 so far or in a period specified by a user, based on the load information 110 output in the optimum measurement time zone indicated by the measurement condition 130. The analysis unit 14 calculates a magnitude of an accumulated load on the water pipeline 20, for example, from a magnitude of a stress applied on the water pipeline 20 by a water hammer generated inside the water pipeline 20 represented by the load information 110 and a number of occurrence of water hammers. The analysis unit 14 may apply, in the calculation, a manner of thinking of a stress-number of cycles to failure (S-N) diagram in a material engineering field. The analysis unit 14 may estimate a magnitude of a stress, for example, by using an evaluation equation such as a hoop stress equation or a simulation technique such as a finite element method.

The analysis unit 14 inputs, to the prediction unit 16, a result of analyzing a load applied on the water pipeline 20 so far. The analysis unit 14 presents the analysis result to a user via the presentation unit 18.

The estimation unit 15 estimates a strength of the water pipeline 20, based on the specification information 190 and installation information 191 acquired from the database 19. However, the installation information 191 is information representing an installation state of the water pipeline 20 and is, for example, information representing a time (a year, etc.) in which the water pipeline 20 is installed, a state of soil where the water pipeline 20 is installed, or the like.

The estimation unit 15 may statistically estimate, for example, based on the specification information 190 and installation information 191, a strength of the water pipeline 20 by considering a history of accidents that have occurred in various water pipelines in the past, results of experiments conducted for various water pipelines in a past, and the like. Alternatively, the estimation unit 15 may use, when estimating a strength of the water pipeline 20, a result in which a buried water pipeline 20 is removed by a user and a state of the water pipeline is confirmed. Alternatively, the estimation unit 15 may compare data representing a state of the water pipeline 20 acquired by the measurement unit 11 with past experimental results or contents described in technical literature and thereby estimate a strength of the water pipeline 20. The estimation unit 15 inputs a result of estimating a strength of the water pipeline 20 to the prediction unit 16.

The prediction unit 16 uses, for example, a method of reliability engineering or statistical analysis, based on the analysis result of a load applied on the water pipeline 20 input from the analysis unit 14 and the estimation result of a strength of the water pipeline 20 input from the estimation unit 15 and thereby predicts a probability of occurrence of an accident due to damage in the water pipeline 20. At that time, the prediction unit 16 can use, when, for example, a load having a certain magnitude is applied on a facility having a certain strength, a "load-strength" model representing a magnitude of a possibility in which the facility is damaged.

The prediction unit 16 acquires the accident influence-degree information 192 from the database 19. The accident influence-degree information 192 is information representing a magnitude of an influence when an accident occurs in the water pipeline 20. The magnitude of an influence degree is based on, for example, results of amounts of money of compensation for damage due to accidents that have occurred in the past in the water pipeline 20 and the like.

The prediction unit 16 determines a product of a probability of occurrence of an accident due to damage in the water pipeline 20 and a magnitude of an influence when an accident occurs in the water pipeline 20 represented by the accident influence-degree information 192 determined as described above and thereby predicts a danger degree of an accident with respect to the water pipeline 20. The prediction unit 16 predicts the above-described danger degree of an accident with respect to each of a plurality of water pipelines 20 to be analyzed by the facility state analyzing device 10. The prediction unit 16 inputs a predicted danger degree of an accident to the priority determination unit 17. The prediction unit 16 presents a prediction result to a user via the presentation unit 18.

The priority determination unit 17 acquires repair work information 193 from the database 19. The repair work information 193 is information representing, with respect to the plurality of water pipelines 20, at least either of ease of repair work and an expense for the repair work. The priority determination unit 17 determines a priority of performing repair work with respect to the plurality of water pipelines 20, based on the acquired repair work information 193 and a prediction result of a danger degree of an accident based on the prediction unit 16.

The priority determination unit 17 raises a priority of performing repair work as, for example, a danger degree of an accident is higher, repair work is easier, or an expense for repair work is more inexpensive. At that time, the prediction unit 16 may convert, for example, information represented by the repair work information 193 and a prediction result of a danger degree of an accident based on the prediction unit 16 into an amount of money, based on a predetermined criterion, and determine a priority, based on the converted total amount of money. Alternatively, the priority determination unit 17 may handle, as a normalized indicator, information represented by the repair work information 193 and a prediction result of a danger degree of an accident based on the prediction unit 16 and determine a priority by using a method such as a linear programming method.

The priority determination unit 17 also presents, to a user, the determined priority of performing repair work with respect to the water pipeline 20 via the presentation unit 18.

Figure 3:
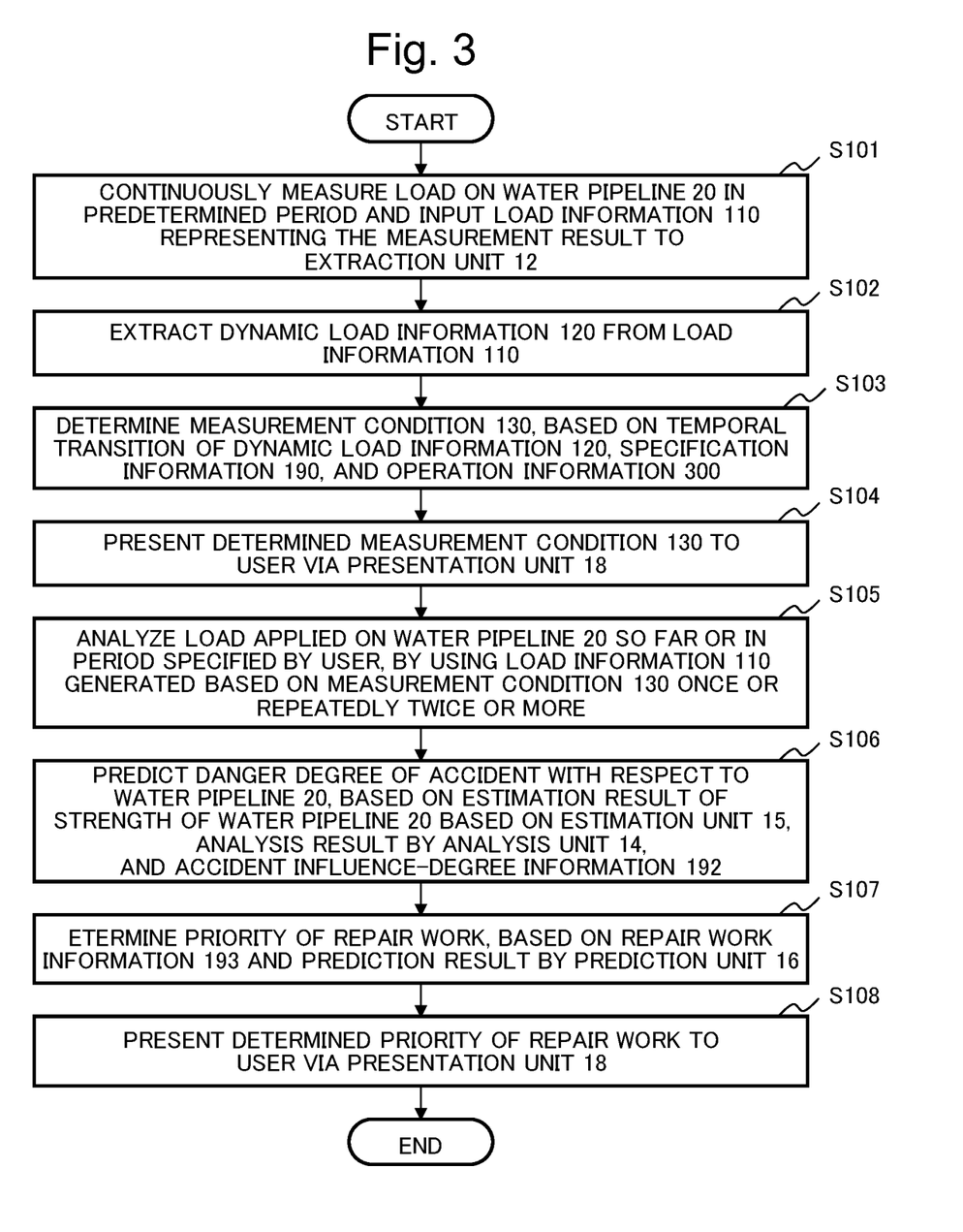
FIG. 3 is a flowchart illustrating an operation of the facility state analyzing device 10 according to the first example embodiment of the present invention.

Next, with reference to a flowchart of FIG. 3, an operation (processing) of the facility state analyzing device 10 according to the present example embodiment is described in detail.

The measurement unit 11 continuously measures a load on the water pipeline 20 in a predetermined period (for example, for one week when the water pipeline 20 is installed in a residential street) and inputs load information 110 representing the measurement result to the extraction unit 12 (step S101). The extraction unit 12 executes predetermined signal processing for a signal representing the load information 110 and extracts dynamic load information 120 from the load information 110 (step S102).

The measurement condition determination unit 13 determines, based on temporal transition of the dynamic load information 120, specification information 190 acquired from the database 19, and operation information 300 acquired from the SCADA system 30, a measurement condition 130 indicating a time zone and a measurement place in which the load information 110 is acquired (step S103). The measurement condition determination unit 13 presents the determined measurement condition 130 to a user via the presentation unit 18 (step S104).

The analysis unit 14 analyzes, based on the measurement condition 130 determined by the measurement condition determination unit 13, a load applied on the water pipeline 20 so far or in a period specified by a user, by using the load information 110 generated by the measurement unit 11 once or repeatedly twice or more (step S105). The prediction unit 16 predicts a danger degree of an accident with respect to the water pipeline 20, based on an estimation result of a strength of the water pipeline 20 based on the estimation unit 15, an analysis result by the analysis unit 14, and accident influence-degree information 192 acquired from the database 19 (step S106).

The priority determination unit 17 determines, based on repair work information 193 acquired from the database 19 and a prediction result by the prediction unit 16, a priority of repair work with respect to the plurality of water pipelines 20 (step S107). The priority determination unit 17 presents the determined priority of repair work to a user via the presentation unit 18 (step S108), and then the entire processing is terminated.

The facility state analyzing device 10 according to the present example embodiment is able to efficiently increase, based on a situation of a load applied on a facility, accuracy in estimating a state of the facility. The reason is that the facility state analyzing device 10 extracts dynamic load information 120 from the load information 110 with respect to the water pipeline 20, determines, based on temporal transition of the extracted dynamic load information 120, the measurement condition 130, and analyzes a load applied on the water pipeline 20 by using the load information 110 acquired based on the measurement condition 130.

Hereinafter, an advantageous effect achieved by the facility state analyzing device 10 according to the present example embodiment is described in detail.

When an accident probability in a future with respect to a facility is estimated, it is important to appropriately evaluate not only a deterioration degree of a facility but also a load applied on the facility. The load fluctuates depending on a time, a place, and the like, and therefore in an evaluation, for example, based on only information relating to a load at a time of designing a facility, it is difficult to expect satisfactory estimation accuracy. For such a problem, it is conceivable to increase estimation accuracy by directly observing, by using a sensor, a physical situation with respect to a facility in an appropriate place and an appropriate time zone. However, commonly, a measurement condition itself based on a sensor is based on information at a time of designing, and therefore, it is difficult to appropriately estimate a current state of a facility in which a load state is different from a load state at a time of designing and it is difficult to appropriately maintain and manage the facility. In order to more highly accurately estimate a current state of a facility, when an information volume to be collected from a sensor is increased, for example, by always collecting information from a sensor, or the like, a communication infrastructure is largely affected. In other words, a problem is that based on a situation of a load applied to a facility so far, accuracy in estimating a state of the facility is efficiently increased.

For such a problem, the facility state analyzing device 10 according to the present example embodiment includes the measurement unit 11, the extraction unit 12, the measurement condition determination unit 13, and the analysis unit 14 and operates as described above, for example, with reference to FIGS. 1 to 3. In other words, the measurement unit 11 measures a load on the water pipeline 20 (facility) and generates, based on a measurement condition 130, load information 110 representing the measured load. The extraction unit 12 extracts, from the load information 110 generated by the measurement unit 11, dynamic load information 120 representing a dynamic component of the load a dynamic fluctuation degree of which with a lapse of time is equal to or more than a reference. The measurement condition determination unit 13 determines, based on temporal transition of the dynamic load information 120, the measurement condition 130 indicating a time zone during which the load information 110 is generated. The analysis unit 14 analyzes a load applied on the water pipeline 20 by using the load information 110 generated based on the measurement condition 130.

In other words, the facility state analyzing device 10 according to the present example embodiment determines, based on a result in which a dynamic component of a load on the water pipeline 20 fluctuates with a lapse of time, the measurement condition 130 indicating an optimum measurement time zone based on the measurement unit 11 in which it is achievable to highly accurately and efficiently acquire a state of the water pipeline 20. The facility state analyzing device 10 then acquires load information 110 in the optimum measurement time zone and analyzes an accumulation of loads applied on the water pipeline 20 so far or in a specified period by using the acquired load information 110. Thereby, the facility state analyzing device 10 according to the present example embodiment can efficiently increase, based on a situation of a load applied on a facility, accuracy in estimating a state of the facility.

The facility state analyzing device 10 according to the present example embodiment uses, when determining the measurement condition 130, both of specification information 190 representing a specification of a water pipeline 20 acquired from the database 19 and operation information 300 representing an operation state of the water pipeline 20 acquired from the SCADA system 30. Thereby, the facility state analyzing device 10 according to the present example embodiment can more correctly determine an optimum measurement time zone.

The facility state analyzing device 10 according to the present example embodiment determines, based on the specification information 190, a load applied on the water pipeline 20 by simulation and thereby determines the measurement condition 130 indicating an optimum measurement place based on the measurement unit 11 in which it is achievable to highly accurately and efficiently acquire a state of the water pipeline 20. A user can install, as necessary, a sensor in an optimum measurement place indicated by the measurement condition 130. Thereby, the facility state analyzing device 10 according to the present example embodiment can further increase, based on a situation of a load applied on a facility, accuracy in estimating a state of the facility.

The facility state analyzing device 10 according to the present example embodiment estimates, based on the specification information 190 and installation information 191 representing an installation state of the water pipeline 20, a strength of the water pipeline 20 and predicts, based on the estimation result and an analysis result of a load applied on the water pipeline 20, a magnitude of a possibility of accident occurrence with respect to the water pipeline 20. The facility state analyzing device 10 then predicts, based on the predicted magnitude of a possibility of accident occurrence and accident influence-degree information 192 representing a magnitude of an influence degree due to accident occurrence, a danger degree of an accident with respect to the water pipeline 20. Thereby, the facility state analyzing device 10 according to the present example embodiment can achieve efficient maintenance management of the water pipeline 20.

The facility state analyzing device 10 according to the present example embodiment determines a priority of performing the repair work with respect to a plurality of water pipelines 20, based on, for each of the plurality of water pipelines 20, repair work information 193 including at least either of ease of repair work and an expense for the repair work and a prediction result of a danger degree of an accident. Thereby, the facility state analyzing device 10 according to the present example embodiment can achieve efficient maintenance management of the plurality of water pipelines 20.

A target for which the facility state analyzing device 10 according to the present example embodiment analyzes an installation state is not limited to the water pipeline 20. The facility state analyzing device 10 may use various facilities other than a water pipeline as an analysis target of an installation state.

Second Example Embodiment

Figure 4:
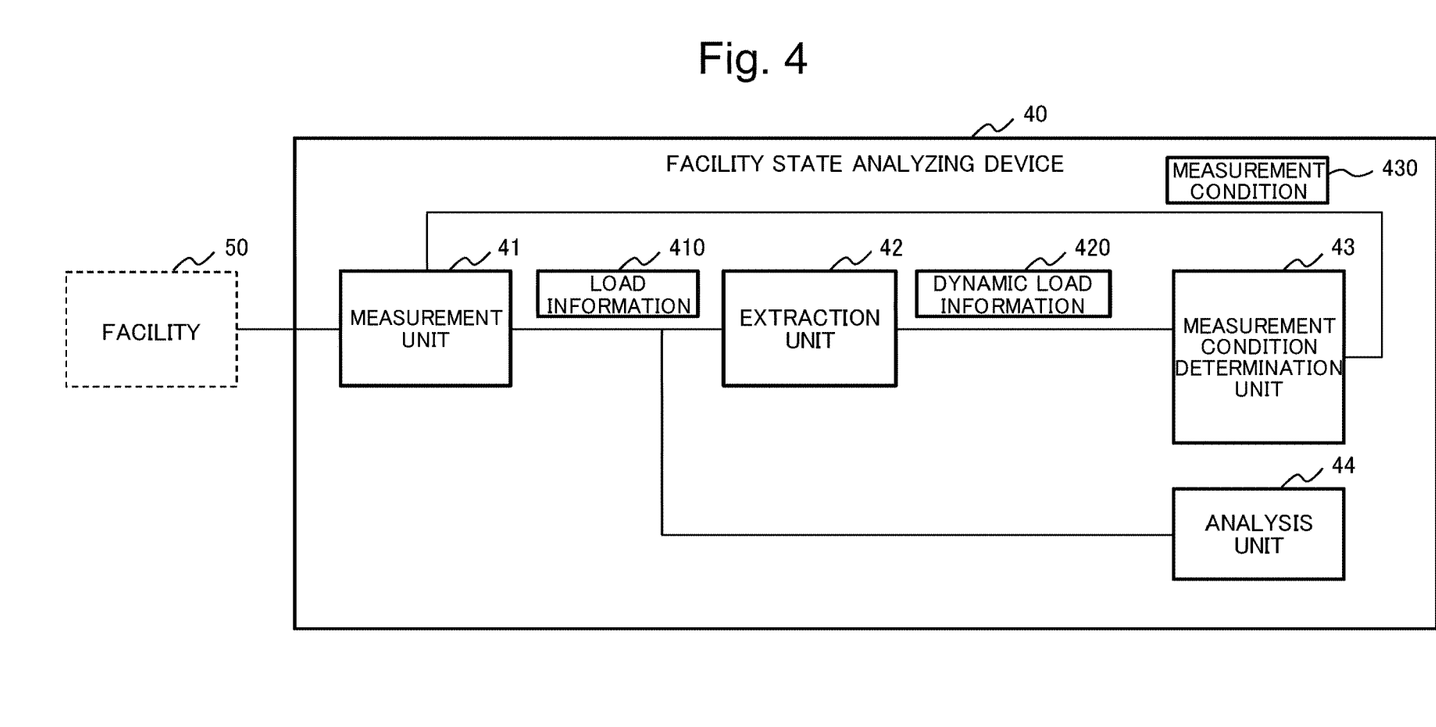
FIG. 4 is a block diagram illustrating a configuration of a facility state analyzing device 40 according to a second example embodiment of the present invention.

FIG. 4 is a block diagram illustrating a configuration of a facility state analyzing device 40 according to a second example embodiment of the present invention.

The facility state analyzing device 40 according to the present example embodiment includes a measurement unit 41, an extraction unit 42, a measurement condition determination unit 43, and an analysis unit 44.

The measurement unit 41 measures a load on a facility 50 and generates, based on a measurement condition 430, load information 410 representing the measured load.

The extraction unit 42 extracts, from the load information 410 generated by the measurement unit 41, dynamic load information 420 representing a dynamic component of the load a dynamic fluctuation degree of which with a lapse of time is equal to or more than a reference.

The measurement condition determination unit 43 determines, based on temporal transition of the dynamic load information 420, the measurement condition 430 indicating a time zone in which the load information 410 is generated.

The analysis unit 44 analyzes a load applied to the facility 50 by using the load information 410 acquired based on the measurement condition 420.

The facility state analyzing device 40 according to the present example embodiment is able to efficiently increase, based on a situation of a load applied on a facility, accuracy in estimating a state of the facility. The reason is that the facility state analyzing device 40 extracts, from the load information 410 relating to the facility 50, the dynamic load information 420, determines, based on temporal transition of the extracted dynamic load information 420, a measurement condition 430, and analyzes a load applied on the facility 50 so far by using the load information 410 acquired based on the measurement condition 430.

<Hardware Configuration Example>

Units in facility state analyzing devices illustrated in FIG. 1 and FIG. 4 according to the above-described example embodiments can be achieved by dedicated hardware (HW) (an electronic circuit). In FIG. 1 and FIG. 4, at least the following components are conceivable as a function (processing) unit (software module) of a software program.

A measurement control function in the measurement units 11 and 41.
The extraction units 12 and 42.
The measurement condition determination units 13 and 43.
The analysis units 14 and 44.
The estimation unit 15.
The prediction unit 16.
The priority determination unit 17.

However, division of units illustrated in these drawings is a configuration for convenience of description, and in implementation, various configurations are assumable. One example of a hardware environment in this case is described with reference to FIG. 5.

Figure 5:
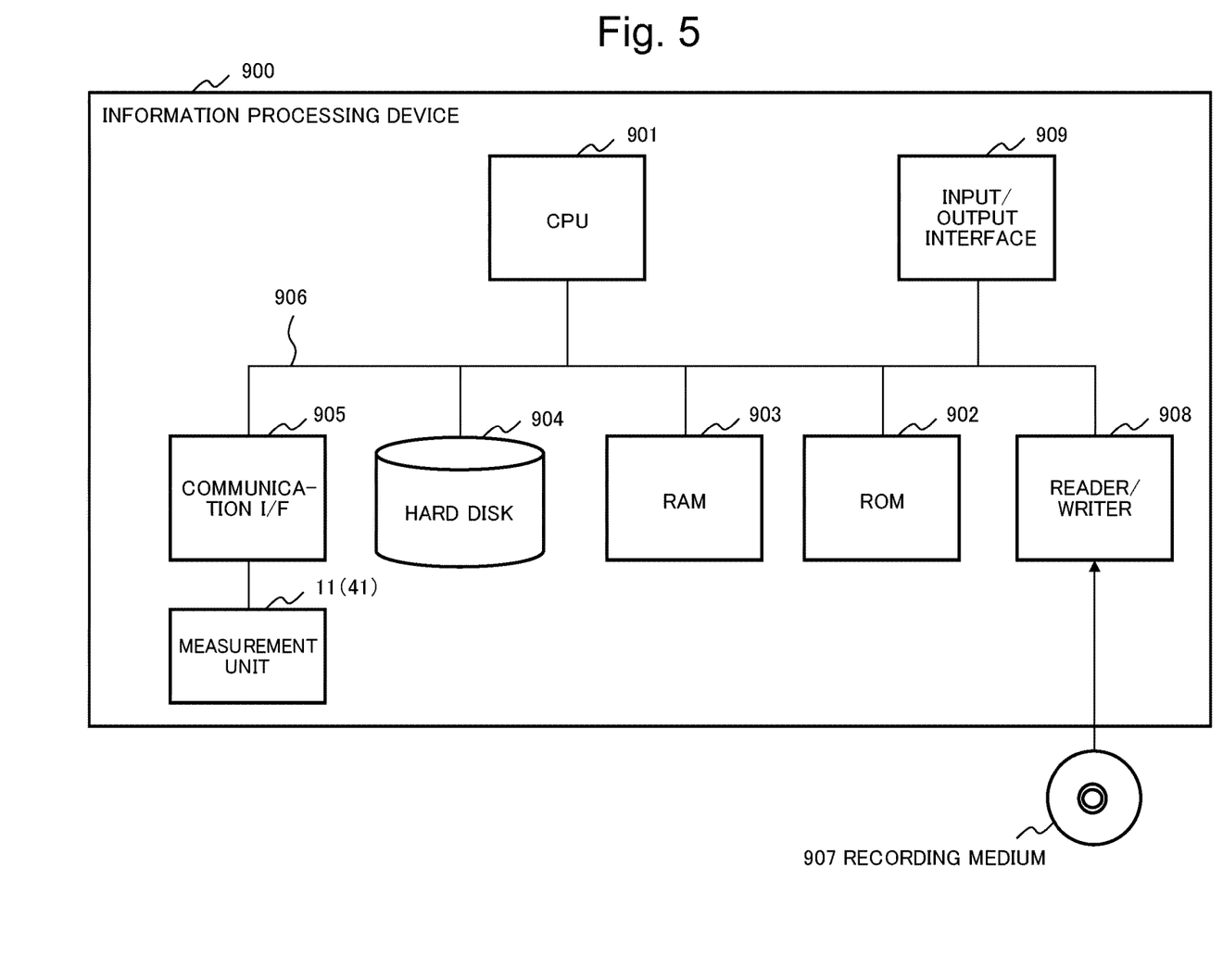
FIG. 5 is a block diagram illustrating a configuration of an information processing device 900 capable of executing a facility state analyzing device according to each example embodiment of the present invention.

FIG. 5 is a diagram exemplarily illustrating a configuration of an information processing device 900 (computer) capable of executing a facility state analyzing device according to each example embodiment of the present invention. In other words, FIG. 5 is a configuration of a computer (information processing device) capable of achieving a facility state analyzing device illustrated in FIG. 1 and FIG. 4 and represents a hardware environment capable of achieving each function according the above-described example embodiments.

The information processing device 900 illustrated in FIG. 5 includes the following as components.

A central processing unit (CPU) 901.
A read only memory (ROM) 902.
A random access memory (RAM) 903.
A hard disk (storage device) 904.
A communication interface 905 to an external device and the measurement unit 11 (41) illustrated in FIG. 1 (FIG. 4).
A bus 906 (communication line).
A reader/writer 908 capable of reading/writing data stored on a recording medium 907 such as a compact disc read only memory (CD-ROM).
An input/output interface 909 such as a monitor or a speaker functioning as an information presentation means and an input device such as a keyboard.

In other words, the information processing device 900 including the above components is a general computer in which the components are connected via the bus 906. The information processing device 900 may include a plurality of CPUs 901 or a CPU 901 constituted of a multicore.

The present invention having been described by using the above-described example embodiments as examples supplies a computer program capable of achieving the following function to the information processing device 900 illustrated in FIG. 5. The function is a function of the above-described configuration in a block configuration diagram (FIG. 1 and FIG. 4) or a flowchart (FIG. 3) referred to in description of the example embodiments. Thereafter, the present invention is achieved by reading the computer program into the CPU 901 being the hardware and by interpreting and executing the read computer program. The computer program supplied into the device may be stored on a readable/writable volatile memory (RAM 903) or a non-volatile storage device such as a ROM 902 and a hard disk 904.

In the case, as a supply method of a computer program into the hardware, currently, a general procedure is employable. The procedure includes, for example, a method of installation into the device via various types of recording media 907 such as a CD-ROM and a method of download from an outside via a communication line such as the Internet. In such a case, it is conceivable that the present invention includes a code configuring the computer program or the recording medium 907 storing the code.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2018-026173, filed on Feb. 16, 2018, the disclosure of which is incorporated herein in its entirety by reference.

REFERENCE SIGNS LIST

10 Facility state analyzing device
11 Measurement unit
110 Load information
12 Extraction unit
120 Dynamic load information
121 Static load information
13 Measurement condition determination unit
130 Measurement condition
14 Analysis unit 15 Estimation unit
16 Prediction unit
17 Priority determination unit
18 Presentation unit
19 Database
190 Specification information
191 Installation information
192 Accident influence-degree information
193 Repair work information
20 Water pipeline
30 SCADA system
300 Operation information
40 Facility state analyzing device
41 Measurement unit
410 Load information
42 Extraction unit
420 Dynamic load information
43 Measurement condition determination unit
430 Measurement condition
44 Analysis unit
50 Facility
900 Information processing device
901 CPU
902 ROM
903 RAM
904 Hard disk (storage device)
905 Communication interface
906 Bus
907 Recording medium
908 Reader/writer
909 Input/output interface

What is claimed is:

1. A facility state analyzing device comprising:
at least one memory storing a computer program; and
at least one processor configured to execute the computer program to:
measure a first load on a facility using a sensor;
generate first load information based on the first load on the facility that has been measured;
extract, from the first load information that has been generated, dynamic load information representing a dynamic component of the first load of which a dynamic fluctuation degree includes a lapse of time is equal to or more than a reference;
determine, based on a temporal transition of the dynamic load information, a measurement condition indicating a time zone;
measure a second load on the facility using the sensor under the measurement condition that has been determined based on the temporal transition;
generate second load information based on the second load on the facility that has been measured; and
analyze the second load information.

2. The facility state analyzing device according to claim 1, wherein the processor is configured to execute the computer program to:
analyze a frequency component of a signal representing the first load information, the frequency component being included in the signal, or execute signal processing of analyzing a temporal change of the signal, to extract the dynamic load information.

3. The facility state analyzing device according to claim 1, the processor is configured to execute the computer program to:
determine the measurement condition based on specification information representing a specification of the facility and operation information representing an operation state of the facility, the specification information and the operation information acquired from outside.

4. The facility state analyzing device according to claim 3, wherein the processor is configured to execute the computer program to:
determine the measurement condition as indicating a measurement place, by determining the first load by simulation based on the specification information.

5. The facility state analyzing device according to claim 3, wherein the processor is configured to execute the computer program to:
estimate a strength of the facility, based on the specification information and installation information representing an installation state of the facility;
predict, based on estimation of the strength of the facility and analysis of the second load information, a magnitude of a possibility of occurrence of an accident with respect to the facility; and
predict a danger degree of the occurrence of the accident, based on the magnitude of the possibility of the occurrence of the accident that has been predicted and a magnitude of an influence degree of the occurrence of the accident.

6. The facility state analyzing device according to claim 5, wherein the processor is configured to execute the computer program to:
determine a priority of performing repair work with respect to a plurality of the facilities, based on, for each of the plurality of the facilities, repair work information including at least either ease of the repair work or an expense for the repair work, and the danger degree that has been predicted.

7. The facility state analyzing device according to claim 1, further comprising
a presentation device being able to present information to a user by using an input/output interface, wherein the processor is configured to execute the computer program to:
provide the measurement condition that has been determined to the presentation device.

8. The facility state analyzing device according to claim 1, wherein
the facility is a pipeline through which fluid flows, and
the processor is configured to execute the computer program to:
extract, from the first load that includes a static pressure and a dynamic pressure by the fluid, the dynamic load information that represents the dynamic pressure.

9. A facility state analyzing method comprising:
measuring, by a processor, a first load on a facility using a sensor;
generating, by the processor, first load information based on the first load on the facility that has been measured;
extracting, by the processor and from the first load information that has been generated, dynamic load information representing a dynamic component of the first load of which a dynamic fluctuation degree includes a lapse of time is equal to or more than a reference;
determining, by the processor and based on a temporal transition of the dynamic load information, a measurement condition indicating a time zone;
measuring, by the processor, a second load on the facility using the sensor under the measurement condition that has been determined based on the temporal transition;

generating, by the processor, second load information based on the second load on the facility that has been measured; and analyzing, by the processor, the second load information.

10. A non-transitory computer-readable recording medium storing a facility state analyzing program executable by a computer to perform:

measuring a first load on a facility using a sensor;

generating, by the processor, first load information based on the first load on the facility that has been measured;

extracting, from the first load information that has been generated, dynamic load information representing a dynamic component of the first load of which a dynamic fluctuation degree includes a lapse of time is equal to or more than a reference;

determining, based on a temporal transition of the dynamic load information, a measurement condition indicating a time zone;

measuring a second load on the facility using the sensor under the measurement condition that has been determined based on the temporal transition;

generating second load information based on the second load on the facility that has been measured; and analyzing the second load information.

* * * * *